United States Patent

[11] 3,582,679

| [72] | Inventors | Ralph W. Carp<br>Baltimore, Md.;<br>Ralph M. Miller, Hellam, Pa. |
|---|---|---|
| [21] | Appl. No. | 771,580 |
| [22] | Filed | Oct. 29, 1968 |
| [45] | Patented | June 1, 1971 |
| [73] | Assignee | The Bendix Corporation |

[54] SPEED SENSITIVE CONTROL CIRCUIT
1 Claim, 2 Drawing Figs.

[52] U.S. Cl. ................................................ 307/235,
180/105, 307/233
[51] Int. Cl. .................................................. H03k 5/20
[50] Field of Search ............................................ 307/228,
233, 235; 180/105—110

[56] References Cited
UNITED STATES PATENTS

| 2,985,836 | 5/1961 | Hatton | 307/235X |
| 3,275,926 | 9/1966 | Sheheen | 307/228X |

*Primary Examiner*—John S. Heyman
*Assistant Examiner*—John Zazworsky
*Attorneys*—Plante, Arens, Hartz, Hix & Smith, Bruce L. Lamb, William G. Christoforo and Lester L. Hallacher

ABSTRACT: A control circuit for maintaining a detected condition at a maximum level. The condition, for example, the speed of an automobile, is detected by a sensor which includes a rotating magnet and a sensing coil. The rotation of the magnetic field is proportional to the velocity of the automobile and therefore the output frequency of the sensing coil is directly proportional to the speed of the vehicle. As the sensor output increases due to increases in the condition the limiting circuit actuates a counting circuit. The counting circuit then actuates a differential circuit which yields an output proportional to the detected condition. When the output of the difference circuit is above a predetermined level the current in an actuating coil is reduced to zero and full control is realized. When the output of the sensor is below a set level, current in the coil is a maximum and no limiting occurs. For conditions between the two extremes partial control is realized.

PATENTED JUN 1 1971

3,582,679

INVENTORS
RALPH W. CARP
RALPH M. MILLER

BY *Leslie L. Gallacher*

ATTORNEY

SPEED SENSITIVE CONTROL CIRCUIT

Many forms and types of devices presently exist for detecting and controlling the speed of an automobile or other such vehicles. Some of these devices are basically electronic devices while others are basically mechanical devices. Generally speaking, the existing electronic devices are automatic speed controls. With this type of device the speed of an automobile can be set at any selected level and the system will maintain the automobile at the selected speed irrespective of the terrain. Because the speed at which the automobile is maintained is selected by the driver, any speed can be selected. For example, the driver can select a speed which is highly in excess of the legal speed limit. Also the driver can intentionally accelerate the vehicle and thereby exceed the selected level, even though the system is in operation. The system, therefore, does not constitute a maximum speed control which is useful for safety purposes, but instead constitutes an automatic speed control which is useful primarily for the convenience and comfort of the driver.

Some mechanical systems exist which do maintain the velocity of the vehicle at a preselected maximum. Generally, these devices are called governors and ordinarily prevent the engine from exceeding a selected number of revolutions per minute. These systems therefore interfere with the performance of the vehicle engine. This interference with engine performance renders such systems undesirable because they decrease the efficiency of the engine and thereby increase the cost of its operation. They also are undesirable because the acceleration and other such performance characteristics of the engine should not be interfered with in order to promote the safety and convenience of the driver. Because of these inherent deficiencies of the presently existing devices there has long existed in the art the need for a control system which automatically maintains the velocity of a vehicle at a preselected maximum without interfering with the performance characteristics of the engine. A complete system which accomplishes this purpose is fully described in application Ser. No. 773,598 by R. F. Emery, S. P. Mirabile and M. Slavin, G. T. Bata entitled Vehicle Stop Speed Limiter filed on Nov. 5, 1968 and assigned to the same assignee as the instant invention. The above referred to application describes a system wherein the velocity of a vehicle is maintained at a preselected maximum speed irrespective of the desires and intentions of the driver. The instant invention is a control circuit which is useful with the above named system.

It is therefore an object of this invention to provide a control circuit for incorporation into a system which maintains a condition at a preselected maximum.

It is another object to provide such a circuit which prevents the velocity of a car from exceeding a predetermined maximum.

It is another object to provide such a circuit which asserts zero control under a first predetermined level and maximum control over a second predetermined level and partial control between the two extreme conditions.

It is another object to provide such a circuit which automatically assumes and releases control as the predetermined levels are reached and moved away from.

It is another object to provide such a circuit which fully controls the vehicle speed if attempts are made to overcome its effects by shorting or removing the sensor or by removing the biasing voltage to the circuit.

These and further objects and features of the invention will become apparent upon reading the following description and in conjunction with the accompanying drawings, wherein like numerals indicate like elements and in which.

Figure 1:
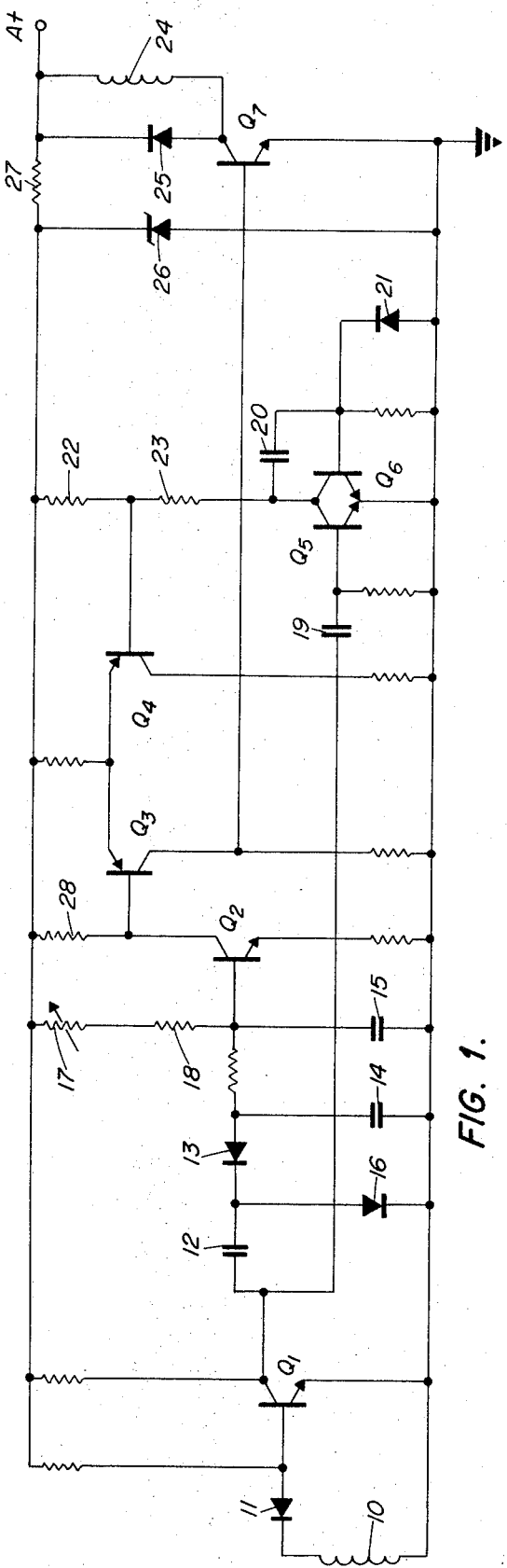
FIG. 1 shows a first preferred embodiment of the instant invention.

The embodiment in FIG. 1 contains an input coil 10 and an output coil 24. Input coil 10 is the sensing coil of a rotational speed sensor. The sensor can be any of several available types. However, a preferable embodiment is shown in application Ser. No. 773,597 filed by R. M. Miller and M. Slavin on Nov. 5, 1968 and entitled Electrical Speed Transducer assigned to the same assignee as the instant invention. Output coil 24 is incorporated into the top speed limiter system described in application Ser. No. 773,598 referred to herein above, in such a manner that the vehicle is not under the limiting control of the circuit when current flows through coil 24 and is fully limited when no current flows through coil 24. This is a design feature of the system and can be reversed so that limiting occurs when current flows and limiting ceases when no current flows. The mode of operation explained hereinafter is selected because it enhances the tamper proof features of the system.

The speed sensor is designed such that the frequency of the output of sensor coil 10 is directly proportional to the speed of the vehicle. This output is fed to diode 11 which conducts only on the negative half of the output cycle. The negative half-cycles are applied to the base of transistor $Q_1$ which turns off upon the application of these pulses when they are above a level sufficient to turn off the transistor. A minimum speed must therefore be realized before the system is operative. When transistor $Q_1$ is conductive capacitor 12 charges through diode 13. The charging of capacitor 12 places an average charge on the base of transistor $Q_2$ which tends to make it negative. At the same time that capacitor 12 tends to make the base of transistor $Q_2$ negative the biasing voltage applied through potentiometer 17 and resistor 18 tend to make the base positive. The positive charge on the base of transistor $Q_2$ tends to charge capacitors 14 and 15. The current taken by capacitor 12 tends to discharge capacitors 14 and 15. Consequently, as the speed of the vehicle increases resulting in an increase in frequency of the output from transistor $Q_1$, the discharge through diode 13 is faster than the charge through potentiometer 17 and resistor 18. This places a more negative voltage on the base of transistor $Q_2$. The output from transistor $Q_2$ is therefore a function of speed. This output is applied to the base of transistor $Q_3$ and the voltage on the base of transistor $Q_3$ is therefore a function of speed. This is apparent when it is realized that the base of transistor $Q_3$ is positively biased by the $A^+$ voltage source through resistor 28. Consequently, as the output from transistor $Q_2$ changes with vehicle speed the net voltage on the base of transistor $Q_3$ also changes.

As the collector voltage of transistor $Q_1$ increases the base of transistor $Q_5$ is driven positive through capacitor 19. Transistor $Q_5$ is therefore turned on and capacitor 20 discharges through diode 21. When capacitor 19 is charged transistor $Q_5$ turns off and the collector voltage of transistors $Q_5$ and $Q_6$ therefore increases. The collector voltage causes a current in the base of transistor $Q_6$ because capacitor 20 begins to charge. The voltage on the collector of transistor $Q_6$ therefore increases in a ramplike function. This ramp is divided by resistors 22 and 23 and a small ramp is applied to the base of transistor $Q_4$.

Transistors $Q_3$ and $Q_4$ are connected to form a differential amplifier. The input to the base of transistor $Q_3$ is a function of the vehicle speed as explained hereinabove. The input to the base of transistor $Q_4$ is the small ramp. When the voltage on the base of transistor $Q_3$ is below the lowest ramp voltage transistor $Q_3$ conducts and transistor $Q_7$ therefore also conducts. Conduction of transistor $Q_7$ causes a current through coil 24. In this condition the current through coil 24 is a maximum and no limiting occurs. When the voltage present on the base of transistor $Q_3$ is above the ramp voltage transistor $Q_4$ conducts and transistors $Q_3$ and $Q_7$ do not. When transistor $Q_7$ is not conducting there is no current flow through coil 24 and the system is then in a full limiting condition. As the voltage level present on the base of transistor $Q_3$ moves up and down the ramp, as the speed changes between the maximum and minimum conditions, transistor $Q_7$ is turned on and off for varying periods of time. In effect, the circuit is therefore a pulsewidth modulator and the on to off ratio of the output changes as the crossover between the speed voltage on base of transistor $Q_3$ and the ramp voltage on the base of transistor $Q_4$ moves up and down the ramp. In this condition the control circuit is exercising partial limiting upon the system. The amount of limiting depends upon the on-off cycle of transistor $Q_7$. At the speed where limiting is just beginning transistor $Q_7$ is on most of the time and off only a small portion of the time. As the maximum speed is approached the ramp voltage exceeds the voltage on the base of transistor $Q_3$ a large percentage of the time. The pulses applied to the base of transistor $Q_7$ are therefore longer in time and the transistor is off longer. The duty cycle is consequently changed to, for example, 10 percent on and 90 percent off. This can be more fully understood by reading the application relative to the limiting system referred to hereinabove.

Referring back to the base of transistor $Q_2$ and the positive biasing voltage applied through potentiometer 17 and resistor 18, it should be noticed that this biasing voltage can be adjusted by adjusting the setting of potentiometer 17. This enables the speed at which limiting occurs to be adjusted. However, as a safety control feature this adjustment would be made at the time of fabrication and the pot setting then fixed by the use of some permanent adhesive or by inserting the entire circuit into a sealed and possibly potted package.

Diode 25 which is connected between the positive biasing source and the collector of transistor $Q_7$ provides a path for the discharge of current from coil 24 when the magnetic field collapses. Diode 26 is a Zener diode used to stabilize the $A^+$ biasing voltage applied to the circuit. Resistor 27 is a biasing resistor which decreases the current flow through Zener 26 and thereby prevents overloading of the Zener.

Figure 2:
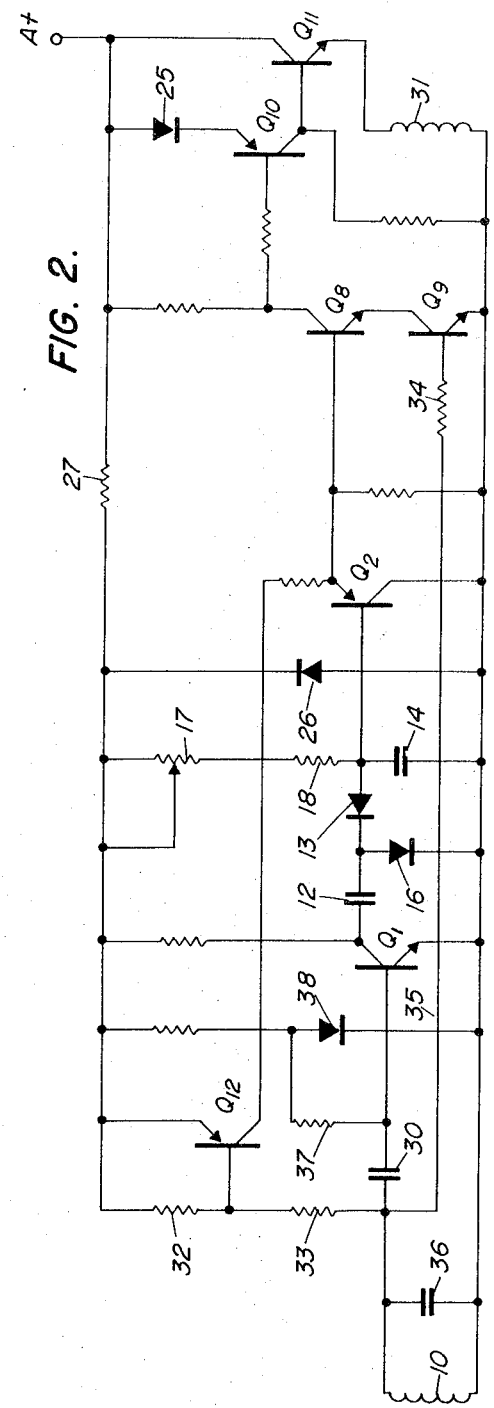
FIG. 2 shows a second preferred embodiment of the instant invention which has several features incorporated therein which render the circuit substantially tamper proof.

The embodiment in FIG. 2 also contains an input coil 10 and an output coil 31. Input coil 10 is again the sensing coil of the magnetic sensor. In the same manner as the FIG. 1 embodiment current flow through coil 31 constitutes a no limiting condition and the absence of current through coil 31 constitutes a full limiting condition.

The input from coil 10 is applied to the base of transistor $Q_1$ through a capacitor 30. When the voltage from capacitor 30 is above a level sufficient to turn off transistor $Q_1$, capacitor 12 is charged through diode 16. The charge on capacitor 12 tends to discharge capacitor 14 through diode 13 when $Q_1$ turns on. It should be noted that capacitor 14 has been charged by the $A^+$ biasing source through potentiometer 17 and resistor 18. Capacitor 14 is therefore simultaneously discharged by capacitor 12 and charged through resistors 17 and 18. As the input from the sensor 10 increases due to speed increases, the discharge rate of capacitor 14 exceeds the charging rate and therefore a ramp is present on the base of transistor $Q_2$. The portion of the ramp which is above the level required to fire transistor $Q_2$ fires the transistor and a series of pulses is applied to the base of transistor $Q_8$. The series of pulses present on the base of transistor $Q_8$ vary in width as the level of the ramp present on the base of transistor $Q_2$ varies above the firing level of the transistor. These pulses turn transistor $Q_8$ on and consequently its output is proportional to the input from sensor 10. When transistor $Q_8$ is turned on its normal conditions at low speeds, transistors $Q_{10}$ and $Q_{11}$ are turned on and current flows through coil 31. This is the unlimited condition of the vehicle. When transistor $Q_8$ turns off it applies a voltage to transistor $Q_{10}$ causing it and transistor $Q_{11}$ to be turned off. In this condition no current flows through coil 31 and the automobile is speed limited. Because the input to transistor $Q_8$ is a series of pulses transistors $Q_{10}$ and $Q_{11}$ are pulsed on and off resulting in an averaging current through coil 31. For this reason limiting conditions between full limiting and full unlimiting are possible.

A biasing voltage is applied to the base of transistor $Q_9$ through resistors 32, 33 and 34 via line 35. Line 35 is connected to the junction of capacitors 30 and 36. Transistor $Q_9$ is connected between the emitter of transistor $Q_8$ and ground. If an attempt is made to remove the effects of the limiting circuit by shorting the sensor coil 10 the base of transistor $Q_9$ is grounded. Capacitor 36 will then discharge causing transistor $Q_9$ to turn off, turning off transistor $Q_8$ and thereby cutting off transistors $Q_{10}$ and $Q_{11}$, thereby cutting off the current flow through coil 31. In this condition the automobile is full limited. The removal of coil 10 would be another way of attempting to tamper with the control circuit. Such a removal would result in the reduction of current flow through resistors 32 and 33. Voltage on the base of transistor $Q_{12}$ would therefore rise turning off transistor $Q_{12}$ and the biasing voltage on the emitter of transistor $Q_2$ would drop. This would cause transistor $Q_2$ to turn off and therefore transistor $Q_8$ would also turn off and cut off transistors $Q_{10}$ and $Q_{11}$ resulting in the cessation of current flow through coil 31. An attempt at tampering with the control circuit by the removal of the $A^+$ biasing source would immediately result in the cessation of current flow through coil 31 and consequently put the vehicle into full limiting. It is therefore seen that the addition of transistors $Q_9$ and $Q_{12}$ to the circuit render it practically tamper proof.

It should be noted that because the biasing potential on the base of transistor $Q_2$ is in part determined by the setting of potentiometer 17 the speed at which the circuit goes into full limiting can be predetermined by the setting of potentiometer 17 in much the same manner as the embodiment shown in FIG. 1. Resistor 37 and diode 38 provide temperature stable bias for transistor $Q_1$. Diode 25 shifts the operating point of $Q_{10}$ by introducing a second diode drop in series with the base emitter diode drop of $Q_{10}$. Zener 26 in FIG. 2 performs the same voltage regulation function as Zener 26 in FIG. 1.

Although this invention has been described with respect to particular embodiments thereof, it is not to be so limited, as changes and modifications may be made therein which are within the spirit and scope of the invention as defined by the appended claims.

We claim:

1. A control circuit for use in a vehicle top speed limiting system comprising:
   means for generating a signal proportional to the speed of said vehicle;
   means for receiving said signal and generating an output when said signal is above a predetermined level;
   means for generating a biasing voltage;
   a capacitor network connected between said means for generating a biasing voltage and said means for receiving said proportional signal, said capacitor network being charged by said biasing voltage and being discharged by said output to produce a net charge proportional to said speed of said vehicle;
   means for detecting said net charge and generating a voltage proportional thereto;
   means controlled by said output for generating a time varying signal, said time varying signal having a period and a maximum amplitude, said period and maximum amplitude being proportional to said speed, the proportionality of said time varying signal being of opposite sense to the proportionality of said voltage proportional to said net charge;
   comparator means for receiving said time varying signal and said voltage proportional to said net charge, said comparator means providing a comparator output when the amplitude of said time varying signal exceeds said proportional voltage level; and
   means for receiving said comparator output and generating a magnetic field proportional thereto and consequently to the speed of said vehicle.